3,536,764
STABILIZED FORMALDEHYDE SOLUTION
Eldred T. Smith and Gene J. Fisher, Corpus Christi, Tex., assignors to Celanese Corporation, New York, N.Y., a corporation of Delaware
No Drawing. Filed July 30, 1968, Ser. No. 748,623
Int. Cl. C07c 47/04
U.S. Cl. 260—606  6 Claims

ABSTRACT OF THE DISCLOSURE

Stabilization of aqueous formaldehyde solutions using a 1,2-dialkyl-2-imidazoline or a 2-alkyl-2-imidazoline at low concentrations. Storage may be at temperatures at low as 25°.

BACKGROUND OF THE INVENTION

Field of the invention

The present invention relates to the stabilization of aqueous formaldehyde solutions, and more particularly, to the stabilization of aqueous formaldehyde using certain alkyl imidazolines.

Description of the prior art

Aqueous solutions of formaldehyde precipitate undesirable polymers when stored at room temperature for several days. Polymer precipitation may be minimized by storing formaldehyde solutions at elevated temperatures. However, side reactions such as, e.g., disproportionation, are thereby increased.

Various stabilizers have been used in aqueous solutions of formaldehyde to prevent undesired precipitation when the solutions are stored at relatively lower temperatures. Conventionally, methanol is employed as a stabilizer of 37 weight percent solutions of formaldehyde, with the methanol being employed at a concentration of about 15 percent in the solution.

SUMMARY OF THE INVENTION

We have now found that the compounds defined by the following formula are effective stabilizers for aqueous formaldehyde:

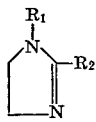

wherein $R_1$ represents hydrogen or a lower alkyl group and $R_2$ represents an alkyl group having at least 10 carbon atoms. Preferably $R_2$ is an alkyl group having from 10 to about 25 carbon atoms.

We have found that aqueous formaldehyde solutions having concentrations as high as about 45 percent by weight are stable to storage for at least 10 days at room temperature when using a stabilizing amount of the foregoing stabilizer, desirably from about 10 to 1000 p.p.m. thereof. While the stabilizer may be used in amounts in excess of 1000 p.p.m., no particular advantage is gained thereby.

DESCRIPTION OF THE PREFERRED EMBODIMENTS

Suitable 2-alkyl-2-imidazolines and 1,2-dialkyl-2-imidazolines which we have found to be effective stabilizers for aqueous formaldehyde solutions include, for example, compounds such as the following: 1-methyl-2-decyl-2-imidazoline, 1-propyl-2-(4-isopropyl dodecyl)-2-imidazoline, 1-ethyl-2-(4,8-eicosadienyl) - 2 - imidazoline, 1-ethyl-2-(9,12,15-octadecatrienyl) - 2 - imidazoline, and 1-tert-butyl-2-heptadecyl-2-imidazoline. Of course, mixtures of the foregoing compounds, or of other compounds falling within the general formula, may also be employed.

Methods for preparing such compounds are, of course, well known, e.g., as by reacting an alkyl substituted ethylenediamine with a carboxylic acid. See A. Weissberger, "The Chemistry of Heterocyclic Compounds," vol. VI, Chapter III (Interscience Inc., New York, 1953).

The stabilizers of the present invention are advantageously employed in aqueous solutions containing up to 45% formaldehyde by weight. The stabilizers are particularly well suited for the stabilization of formaldehyde solutions having concentrations between about 40% and 45%.

As noted, the present stabilizers may be employed at concentrations from about 10 to 1000 p.p.m. or even higher in the stabilized solution. We prefer to use the stabilizer at concentrations between about 100 and 1000 p.p.m., and most preferably between about 100 and 200 p.p.m.

We preferably add the stabilizers to the aqueous formaldehyde solution immediately after the solution is prepared. No heating is needed, and thus both solutions may be at room temperature or even at a somewhat lower temperature if necessary. In some instances, it may be advantageous to heat the stabilized solution, e.g., to a temperature of about 70° C., for a few hours after the stabilizer has been added, although satisfactory results may also be obtained without special heating.

We have found that the stabilized formaldehyde solutions of the present invention are stable to storage at about 25° C. for in excess of 10 days, and frequently for considerably higher periods.

The following examples will further illustrate our invention.

EXAMPLE 1

A 250-ml. sample of freshly prepared 43 wt. percent formaldehyde solution is placed in a bottle, and 0.25 gram of 1-ethyl-2-pentadecyl-2-imidazoline is added. The solution is heated to 70° C., maintained at this temperature for three hours, and then permitted to cool to room temperature. The sample is then maintained at room temperature, approximately 75° F., for 30 days while being observed daily for signs of precipitation. No cloudiness is observed until after 30 days.

EXAMPLE 2

A 1000-ml. sample of 37% by weight of formaldehyde is placed in a flask, and 0.5 gram of 1-methyl-2-(9,12,15-octadecatrienyl)-2-imidazoline is added. The solution is maintained at 75° C. for 30 days and then examined for precipitation. No cloudiness is observed.

Variations can, of course, be made without departing from the spirit of this invention.

What is claimed is:

1. A stabilized aqueous formaldehyde solution comprising up to about 45% by weight formaldehyde and a stabilizing compound of the formula:

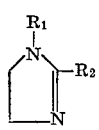

wherein $R_1$ is hydrogen or a lower alkyl group and $R_2$ is an alkyl group having at least 10 carbon atoms, said compound being present in an amount sufficient to stabilize said solution against precipitation of polymer from the solution.

2. The solution of claim 1 wherein said compound is present in an amount of at least about 10 parts per million of said solution.

3. The solution of claim 1 wherein $R_2$ is an alkyl group containing from about 10 to 25 carbon atoms.

4. The solution of claim 1 wherein the amount of said stabilizer compound is from about 100 to 1000 parts per million of said solution.

5. The solution of claim 1 wherein the stabilizer compound is 1-ethyl-2-pentadecyl-2-imidazoline.

6. The solution of claim 1 wherein the stabilizer compound is 1-methyl-2-(9,12,15-octadecatrienyl)-2-imidazoline.

References Cited

UNITED STATES PATENTS 3,423,467   1/1969   Dakli et al. _____ 260—606

FOREIGN PATENTS 871,196   6/1961   Great Britain.

BERNARD HELFIN, Primary Examiner

R. H. LILES, Assitant Examiner